United States Patent
Foss et al.

(10) Patent No.: US 9,239,512 B2
(45) Date of Patent: Jan. 19, 2016

(54) UNDERWATER CAMERA CONTROL

(75) Inventors: Doug Foss, Pacific Grove, CA (US);
Mark Olsson, La Jolla, CA (US);
Christopher McCaslin, Alameda, CA (US); Jarod Armer, Aromas, CA (US)

(73) Assignee: Light & Motion Industries, Marina, CA (US)

( * ) Notice: Subject to any disclaimer, the term of this patent is extended or adjusted under 35 U.S.C. 154(b) by 109 days.

(21) Appl. No.: 12/928,027

(22) Filed: Nov. 30, 2010

(65) Prior Publication Data

US 2012/0133758 A1    May 31, 2012

(51) Int. Cl.
*H04N 9/47* (2006.01)
*H04N 7/18* (2006.01)
*G03B 17/08* (2006.01)

(52) U.S. Cl.
CPC ...................................... *G03B 17/08* (2013.01)

(58) Field of Classification Search
CPC ........................................................ H04N 7/183
USPC ............................................................ 348/81
See application file for complete search history.

(56) References Cited

U.S. PATENT DOCUMENTS

| 3,860,937 | A | 1/1975 | Wolfe |
| 4,381,144 | A | 4/1983 | Breslau |
| 2004/0095506 | A1* | 5/2004 | Scott .............................. 348/373 |
| 2010/0079589 | A1* | 4/2010 | Yoshida et al. ................. 348/81 |

FOREIGN PATENT DOCUMENTS

| GB | 2238136 | 5/1991 |
| GB | 2255648 | 11/1992 |
| WO | WO02071146 | 9/2002 |

* cited by examiner

*Primary Examiner* — Chikaodili E Anyikire
(74) *Attorney, Agent, or Firm* — Thomas M. Freiburger

(57) ABSTRACT

A camera retained in a waterproof underwater housing is controlled remotely and conveniently by a diver holding a hand-held remote device. The device can be a removable handle on the underwater housing, communicating with the camera, usually a movie camera, by infrared or other wireless protocol. Key functional camera settings, which would normally require navigation through a menu tree with a series of steps and selections, are selected by a single press of a button on the hand-held device. An important example is white balance calibration, which typically must be reset for every five feet of depth change.

10 Claims, 6 Drawing Sheets

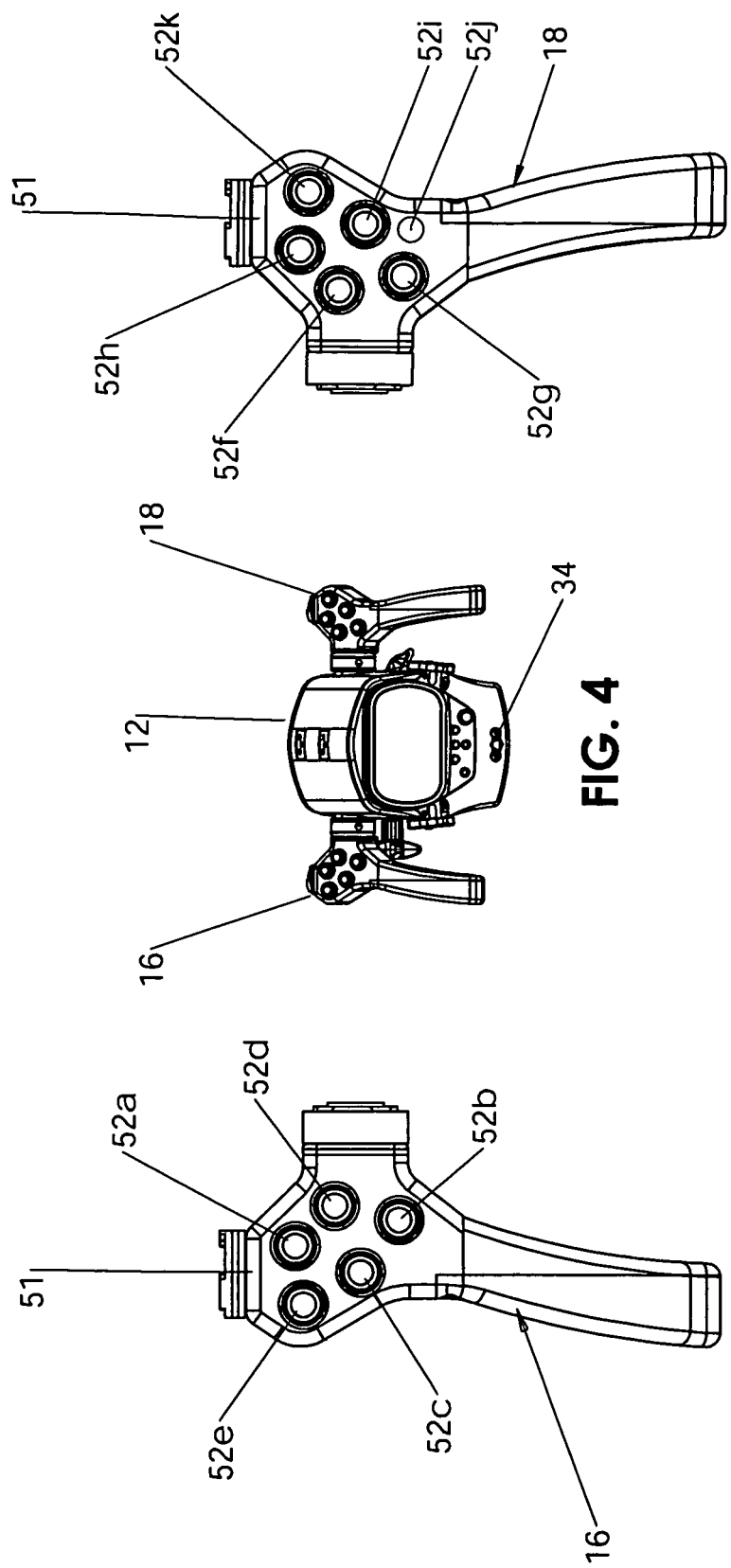

UNDERWATER CAMERA CONTROL

BACKGROUND OF THE INVENTION

This invention concerns underwater photography, and particularly relates to remote controls for a digital camera contained in a waterproof underwater housing. The invention relates in particular to the problem of selecting desired settings for the camera while diving, involving settings that require navigation through a menu tree to reach the desired selection.

For underwater photography, divers typically use a camera mounted in a specifically designed underwater camera housing, sealed against intrusion of water. To operate the camera a waterproof mechanical plunger or lever might be provided to activate the shutter, and still cameras typically have an auto focus feature. In the case of movie cameras, these often are provided with a hand-held remote device not only to activate filming but also for selection of photography settings. These include, among many others, a white balance function. In underwater photography the blue-green color of the water acts as a filter that removes much of the red, orange and yellow light, to a greater and greater extent with depth. A diver photographing in daylight must reset white balance with every approximately five feet of depth change. The problem is that a typical video camera requires about six menu selection steps to reach and reset the white balance feature. This requires the diver, viewing the camera's monitor screen or a special monitor built into the back of the underwater housing, to use buttons including an arrow key to execute five or six selections or key entries. The entries must be made in a sequential path with delays as the camera processes and responds to each entry.

In prior underwater camera housings the buttons or keys such as present on a particular camera, or present on a remote device provided for the camera, have been reproduced or incorporated in a handle or handles for the waterproof camera housing. The diver thus went through the required sequence of steps using the buttons incorporated in the handle, while watching the video monitor screen (the camera housing has a back monitor that reproduces the image on the camera's monitor). A wireless protocol such as infrared typically is used for communication between the handle/remote device and the camera.

Needed adjustments to underwater photography camera settings are cumbersome and time consuming for divers, and this is particularly true in the case of function settings that must be made fairly frequently, such as the white balance setting. This concern is addressed by the present invention described below.

SUMMARY OF THE INVENTION

A camera retained in a waterproof underwater housing is controlled remotely and conveniently by a diver holding a hand-held remote device. The device can be a removable handle on the underwater housing, communicating with the camera, usually a movie camera, by infrared or other wireless protocol. Key functional camera settings, which would normally require navigation through a menu tree with a series of steps and selections, are selected by a single press of a button on the hand-held device. An important example is white balance calibration, which typically must be reset for every five feet of depth change.

This shortcut is effected by placing, preferably in a hand-held remote device that is configured as a removable side handle for an underwater camera housing, a button that activates a signal emitter to produce and send to the camera a series of selection signals, in correct sequence and with the minimum required pause between signals as is required for the camera to accept and execute each selection. The user pushes the button preferably only once and experiences a few seconds of delay before the actual selection is effectuated. Thus, for example, the button for white balance is pushed as the diver reaches a new depth, and as he watches the monitor screen the colors will be re-balanced after a few seconds delay.

In a preferred embodiment the handle with remote control features, and preferably both handles, left and right, are removable and are independently water-sealed. Both the underwater housing and the handles are water-sealed, so that in the event of removal of the handle or damage to the handle, the camera housing will not be flooded. These and other objects, advantages and features of the invention will be apparent from the following description of a preferred embodiment, considered along with the accompanying drawings.

DESCRIPTION OF THE DRAWINGS

FIG. 4 is a rear view of the camera housing.

FIGS. 4A and 4B are detail views showing control buttons on handles for the housing.

DESCRIPTION OF PREFERRED EMBODIMENTS

Figure 1:
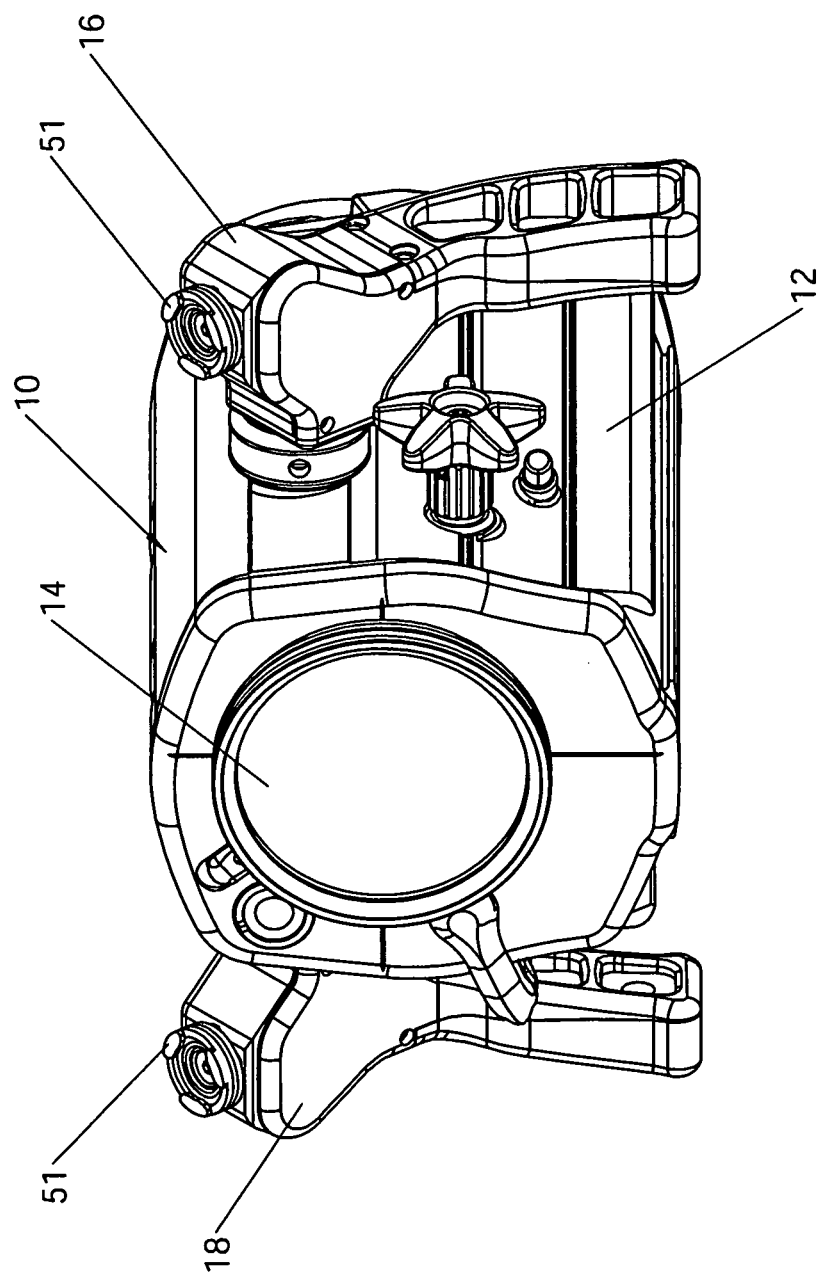
FIG. 1 is a perspective view showing an underwater camera housing of the invention.

In the drawings, FIG. 1 shows an underwater camera housing 10 with a main casing or body 12, a front lens or window 14 and left and right handles 16 and 18, respectively, secured to the housing body. In a preferred embodiment these handles are removable from the camera housing, even underwater, with the camera housing body and handles both independently water-sealed.

Figure 2:
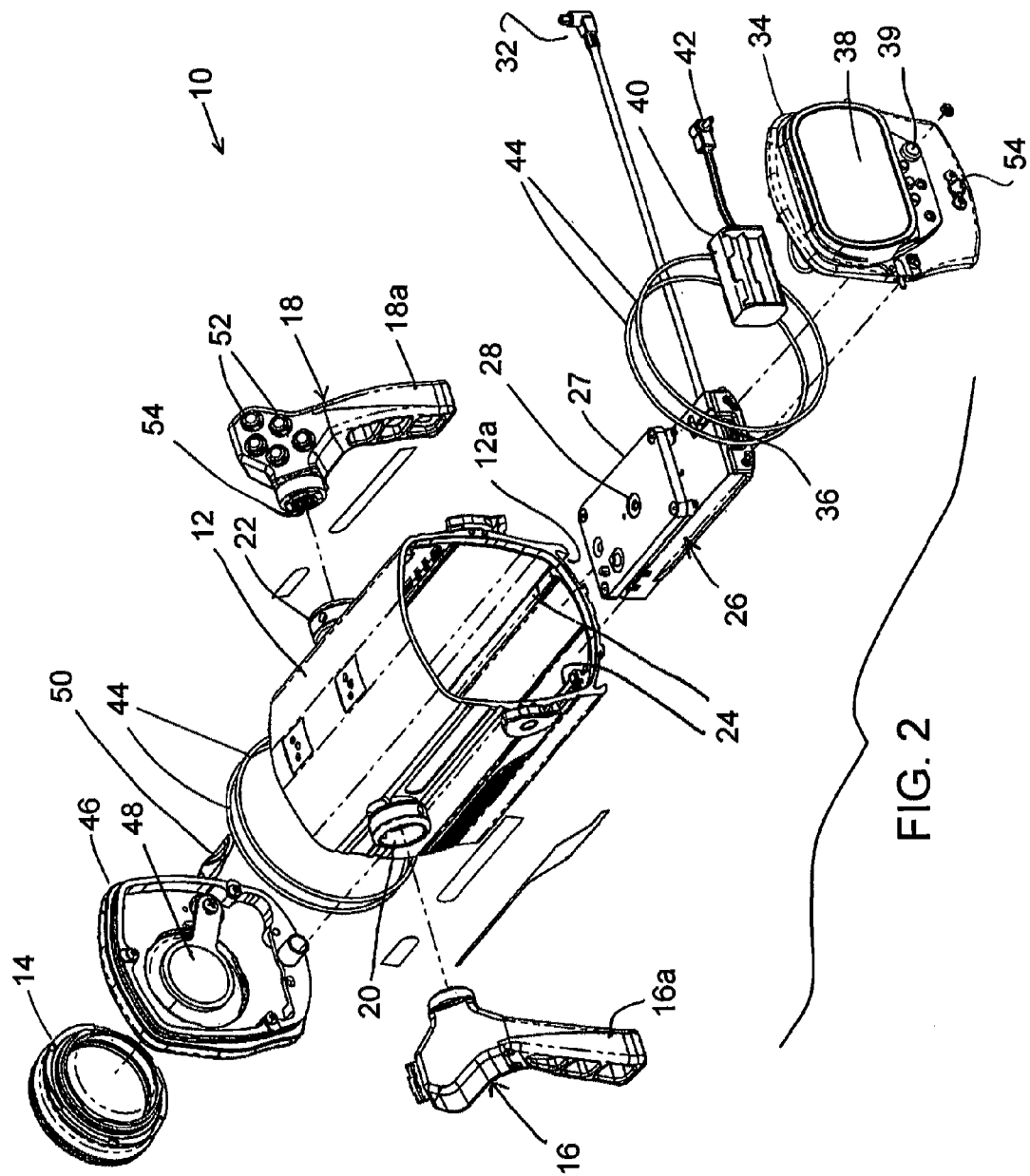
FIG. 2 is an exploded view in perspective showing the components of the underwater camera housing and indicating assembly.

FIG. 2 indicates assembly of a preferred embodiment of the underwater camera housing 10. The body 12 of the housing is shown as an essentially hollow tubular shell, with fittings 20 and 22 at left and right for receiving and securing the handles 16 and 18. The handles are connected in an optically transmissive way, with small windows or ports in both the handle and handle fitting for transmitting control signals, typically infrared remote camera control signals. Digital video cameras are typically provided with remote control capability via an infrared remote device (often used on land, not underwater), and these handles are fitted with electronics so as to be capable of transmitting essentially the same signals as available on the manufacturer-provided remote device for the camera.

The housing body includes a slide track shown at 24 at left and right, in lower part of the housing. This track receives a camera tray 26 which includes or receives an appropriate camera mount attachment 27 for the intended camera. The camera mount 27 has a hole 28 for a standard threaded tripod mount bolt (not shown) to secure to the bottom of a video camera. Such holes 28 can be provided at several different locations in the camera mount 27 for different cameras.

Figure 3:
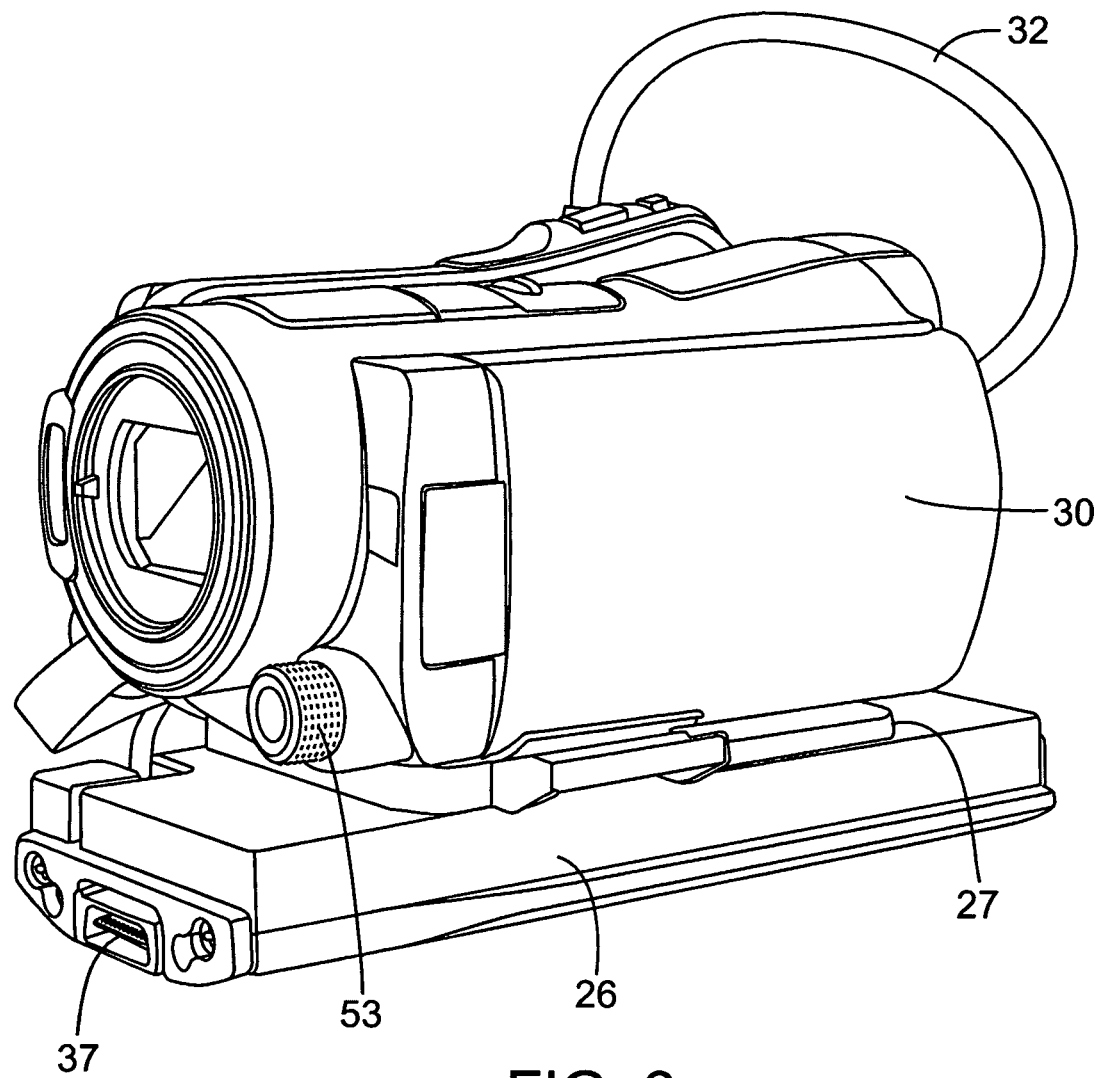
FIG. 3 is a perspective view showing a digital video camera mounted on a camera tray that slides into the underwater housing as indicated in FIG. 2.

FIG. 3 shows a camera 30 mounted on the camera tray 26, with a video connector cable 32 from the tray connected to the camera's video output port. Note that the camera has its own onboard batteries. This enables, as indicated in FIG. 2, the camera tray 26 to connect with a monitor back 34 of the housing, via pin connectors seen at 36 in FIG. 2. All images that would be displayed on the camera's built-in monitor are thus transferred to the monitor screen 38 of the monitor back 34. An alignment device 37 on the front of the tray 26 engages with a mating device at the front of the housing to assure accurate alignment. The device can use pin connectors (although electrical connection need not be made there).

FIG. 2 also shows a battery pack 40 for the monitor back 34. In the model shown, power from the battery pack is connected into the monitor back using a coaxial connector 42.

The exploded view of FIG. 2 also shows O-ring type seals 44 against water intrusion, at the connection between the monitor back 34 and the housing body 12 and also between the forward end of the body 12 and a front plate 46. The front lens or window 14 is threadedly secured to the front plate in a sealed connection. The front plate 46 includes, as is typical, an orange filter 48 that can be manipulated into or out of position using an external lever 50.

The underwater housing handles 16 and 18 are shown at left and right. Preferably each handle has command buttons such as shown at 52 on the handle 18, these being used to send optical command signals through a window 54 of the handle and through the window of the housing fitting 22 or 20 to be received by the camera. In the case of particular camera models, a flexible fiber optic or light pipe may be needed inside the housing to communicate the signals, normally infrared, from the receiving window of the fitting 20, 22 to the receiving device on the camera. As noted above, the handles, at sealed optic ports, as well as the housing fittings 20, 22 are independently water-sealed in this preferred embodiment. Connections between the handles 16, 18 and the fittings 20, 22 can be made by a threaded collar, at 22. With the independent seals, any trauma to the handle will not result in flooding of the camera housing, nor of the handle itself. This eliminates a common failure point of many underwater housings.

Figure 3A:
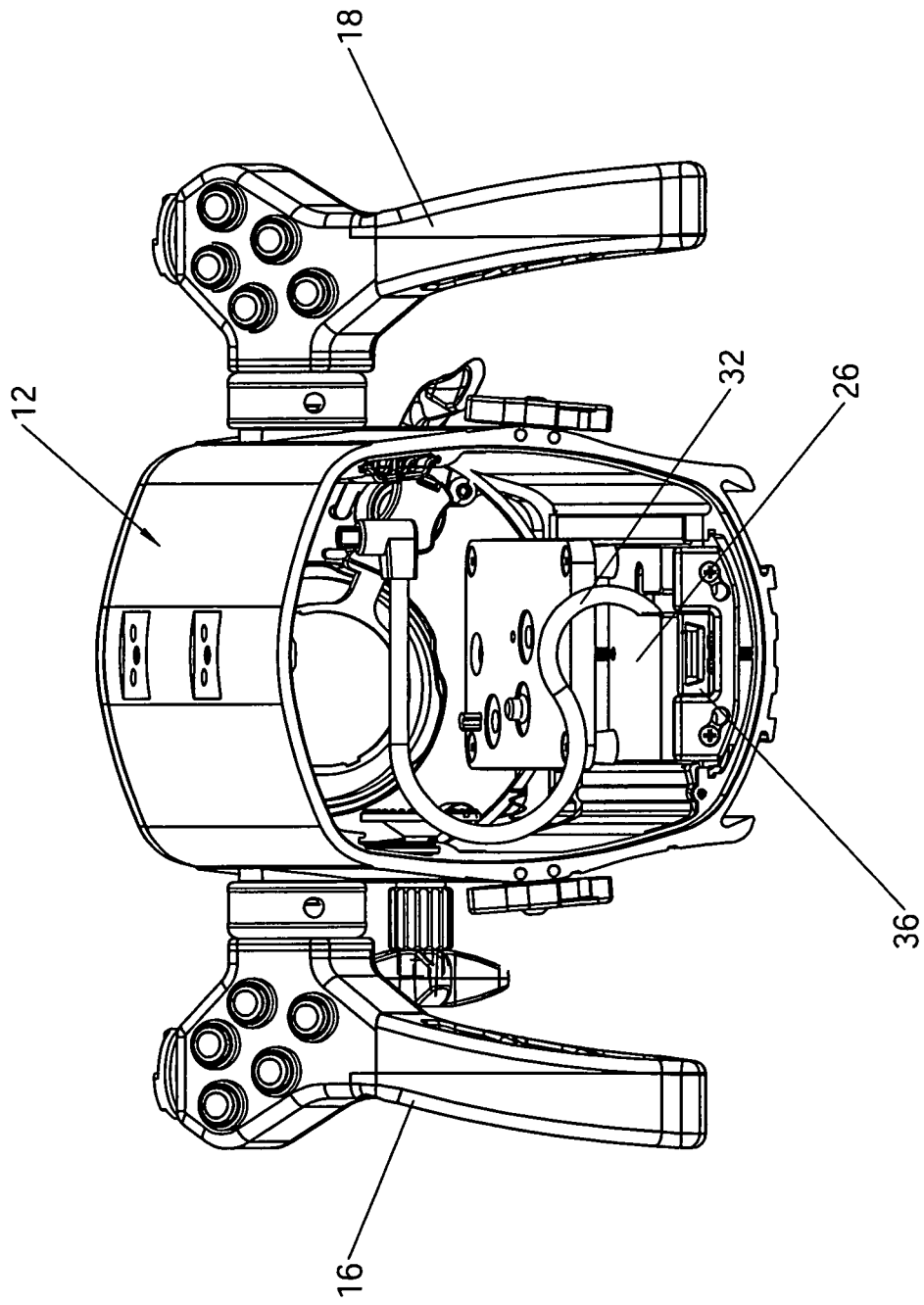
FIG. 3A is a perspective view from the rear of the camera housing without front and back elements.

FIG. 3A shows the camera housing 12 with handles 16 and 18 and without the front plate 46 or back 34. The camera tray 26 is closely fitted in the housing, and when the monitor back 34 is attached the electrical connections are made via the pin connector 36. Preferably a spring (not shown) is included at the front of the housing, engaged by the tray 26 to create spring pressure to urge the tray toward the rear. Once the spring engages, further pushing causes a latch (not shown) to drop in place, locking the camera in the correct position so it is the correct optical distance from the glass optics of the housing.

FIG. 4 shows the assembled camera housing 12 in rear view, with the handles 16 and 18 secured. FIGS. 4A and 4B show upper ends of the left and right underwater housing handles 16 and 18 for this preferred embodiment, showing connections 51 for lights (see also FIG. 1) and also indicating selection buttons 52. Note that each handle has its own onboard batteries, contained in a lower gripping part of the handle 16a, 18a, respectively. These batteries power the electronics contained in the handles. Within each handle, especially the upper portion of the handle beneath the buttons 52, are electronics capable of generating command signals to the camera contained within the underwater casing. As noted above these will generate the same family of command signals as can be generated directly on the video camera itself or via a remote control device which is sold with the video camera. The left handle in FIG. 4A has navigation buttons for up, down, left and right as seen at 52a, 52b, 52c and 52d, respectively. These are used for navigating a menu shown on the monitor 38 when needed. Also included is an "Enter" command button 52e, which is needed only when navigating with the up/down, etc. keys through a series of selections. The buttons 52b and 52d can also be used for remotely turning filming lights (not shown) on and off. For this function the handles can send an IR control signal for the lights into the housing cavity. The monitor back 34 has a receiver (not shown) that detects the signal and re-transmits the signal back outside the housing through a light pipe (not shown) to a light port 54 (FIG. 2) which directs the signal at another receiver located immediately adjacent to the light pipe, on the battery pod that is part of the light system (not shown), the battery pod being attachable to the housing via slide rails 12a at the bottom of the housing (assembly shown on the website uwimaging.com). Once the battery pod receives the command signal it turns the lights on or off as directed. In this manner the diver has control of all functions needed to take video or still images underwater, all from the control handles. This alternative function, control of lights, can be activated by holding the button for more than one second.

The handle on the right in this embodiment (FIG. 4B) has telephoto and wide angle buttons 52f and 52g, i.e. zoom control, an auto focus/manual focus selector button 52h. Manual focus is accomplished by pushing in and turning an external knob (not shown) on the side of the housing so as to engage a camera focus knob 53, and watching the image on the screen much as one would a camera on the surface by rotating the optic ring. Also shown is a record button 52i. An LED indicator light 52j confirms that the camera is recording (this can also be confirmed by observing the video monitor screen 38).

All of the above described control buttons may operate in the same manner as provided with buttons on the camera and on the camera's dedicated remote device. However, a camera function control which is time consuming and cumbersome to operate underwater, normally requiring a considerable number of steps to navigate through a menu tree to make the selection, is effected in the apparatus of the invention by a customized button that provides access to commands normally not accessible with a single user input. This is shown as the button 52k. In this illustrated form of the invention the function is described as the white balance function of the camera, explained above. There are other camera functions and adjustments that require multiple user inputs as well, but this particular function in underwater video photography is particularly important because of the need to frequently reset white balance as one changes depth during diving. Prior to this invention, a diver operating, for example, a Sony video camera and seeking to reset white balance would have to go through many steps to set white balance. The camera typically includes touch screen, and with touch screen operation on the camera itself a user might go through a sequence of about six menu steps to enter the white balance selection. The touch screen provides "short cuts", and when navigating with IR remote operation this can be many more steps using arrow and enter buttons. All the while the diver must be watching the monitor. As an example, the Sony model CX520 Custom WB Macro requires a long sequence of commands for accomplishing white balance resetting, effected by the device of the invention by sending the following sequence of signals: up/up/up/enter/down/enter/down/right/down/enter/down/enter/up/up/up/up/up/enter. For the Sony XR550 camera, the sequence of IR commands is as follows, with explanations at right:

| IR Sequence | Command Explanation |
|---|---|
| up (3) | activates the menu screen which overlays the menus on the video screen. Multiple "up" commands needed to ensure cursor is in top left corner regardless of cursor's start position. |
| enter | brings up the "my menu" screen which allows the user fast access to often used commands |
| down | moves cursor to the white balance button which is programmed to appear on the my menu screen |
| enter | selects white balance and brings up the white balance sub-menu (shown at the bottom of the page) |
| down | white balance has 5 buttons: auto/indoor/outdoor/one push manual/white balance |
| right | navigate cursor down to auto (above) then across to outdoor |
| down | then down to one push |
| enter | selects "one push" as white balance mode if not set this way already |
| down | then down to white balance command |
| enter | tells camera to perform the white balance function (camera is preset to assume one push selected above). The following commands are to exit out of the menu system. |
| up | reverse out of this screen to get the cursor back to the main menu |
| up | up to outdoor |
| up | up to "ok" |
| up (3) | commands are necessary to ensure cursor is in the top left corner. Sometimes the camera ignores a command or two while processing the CWB. |
| enter | selects ok command which returns screen to main display and normal camera function |

With the invention, the diver simply pushes the white balance button 52k, without the need to watch the monitor. There will be a delay of a few seconds, then the reset white balance will show a re-balanced color image.

This customized one-push command signal is provided not by modifying any electronics or programming within the camera, but instead by reproducing the series of command signals in sequence as needed to navigate through the resetting of white balance as noted above. In the chain of signals automatically sent following pushing of the white balance 52k, there are included required pauses between the signals to allow the camera to act on each instruction.

In addition or alternative to the white balance function, other functions that would ordinarily require multiple sequential inputs can be provided with customized buttons. These can include, for example, lens settings (aspect ratio) and manual exposure control (shutter speed and aperture).

The command sequences are stored in memory contained in the handle. The command sequence is preset on manufacture of the underwater housing apparatus for the most popular model of camera used in underwater photography, but if the user has a different model he can select the program that matches the camera. In one preferred scheme this is accomplished by holding down a set of keys for two seconds to change the program. As one example, if the user has a Sony XR520 camera he would hold down on the right handle 18 the "record" and zoom or telephoto keys (52i and 52f in FIG. 4B) simultaneously for two seconds and the handle will change to the XR520 command sequence, remaining with that sequence until the user changes cameras and resets the program by holding, together, a different set of buttons. This enables one camera housing (with handles) to be used for a variety of different cameras. The underwater housing of the invention is provided with programming to handle multiple camera configurations. Thus, a dealer can stock a single housing, and if the customer intends to use the housing with, for example, a Sony 550 camera, the dealer (or the customer) holds down a set of buttons on the handles that set the handles to send the correct sequence for white balance for that particular camera. If instead the customer intends to use the camera with, for example, a Canon S20, he holds down a different set of buttons on the handle to set the handle to the correct white balance sequence for the Canon S20. The handles may also be programmed to allow the dealer or user to open the handles or connect to the handles to upload new code in the future to support new cameras. Since many cameras have different mounting arrangements and different optical positions, the dealer or user may also need to adjust or change the camera tray 26 to fit the specific camera to be used. All this is in contrast to conventional camera housings, which would require a user to buy an entirely new housing when switching to a different camera.

Figure 5:
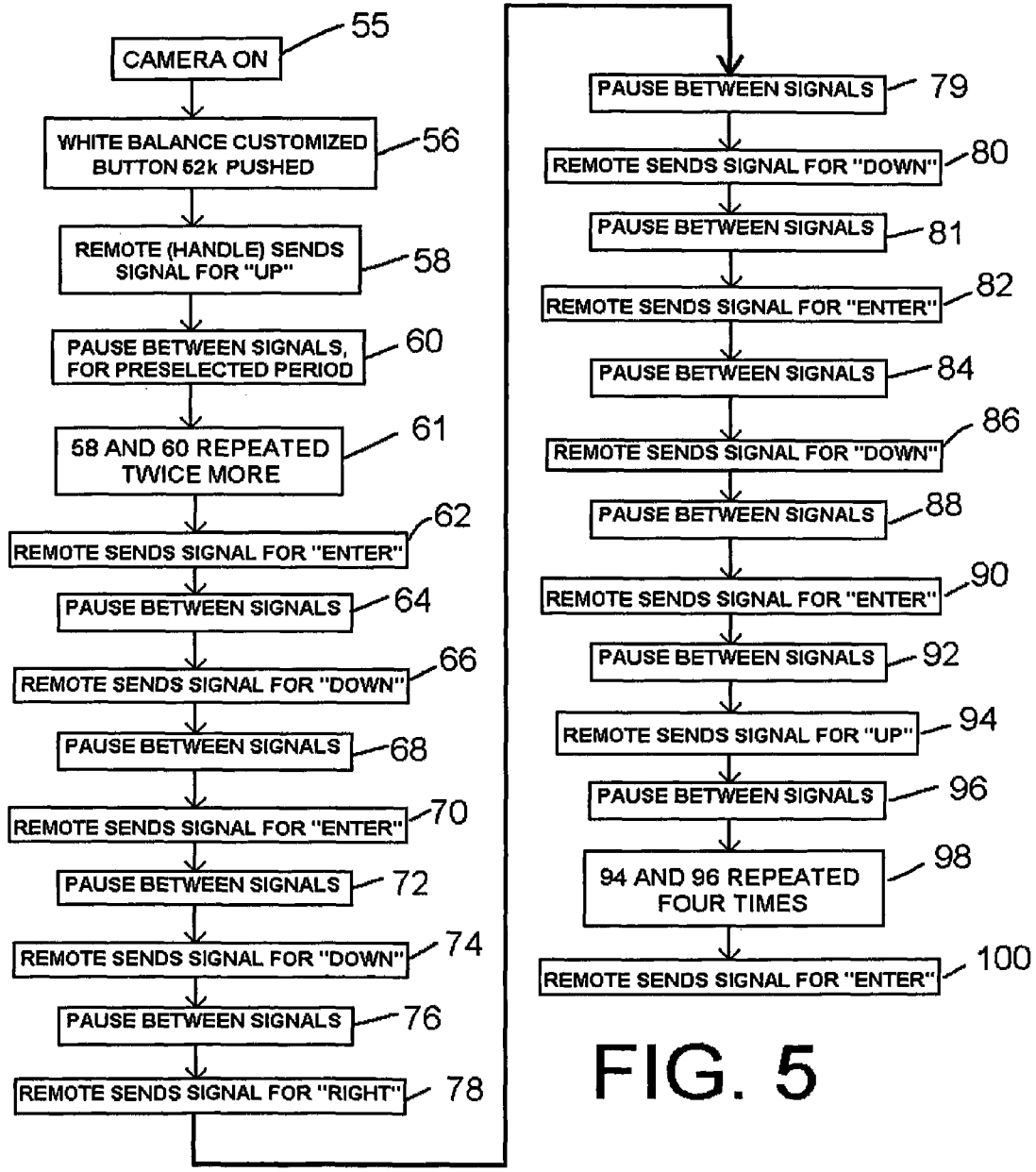
FIG. 5 is a flow chart indicating activation of a customized button on a handle to generate a series of remote control signals to the camera for selection of a specified function setting.

FIG. 5 is a simplified flow chart showing operation of a customized button of the underwater camera housing as one preferred embodiment of the invention, for one type of camera, the Sony XR550. The chart shows a sequence of command signals sent by IR to the camera, as in the sequence listing above. Others may include more steps in the sequence.

The flow chart indicates the camera is on, at the block 55. The camera has its own battery and can be turned on before the camera housing is closed, or in a preferred form of the invention the camera can be turned on/off when in the housing by pushing a button 39 on the monitor back 34 below the screen (FIG. 2). When at depth the diver pushes the white balance customized button 52k on the handle, as indicated at 56. In response, the remote device, which is the electronics in the handle in this case, sends an optical signal for "up", noted in the block 58. The optical signal passes from the handle through the connection into the housing and either bounces around in the housing to find the camera input sensor or the light signal is conducted through a light pipe (not shown) located in the housing. As noted at the block 60, a preselected pause is interjected after the "up" signal has been sent, to give the camera the needed time to execute the command. This pause may be, for example, about one-half second to one second, and is interposed before each following command.

The sequence listing above explains the effect of the command signals in navigation of the menu.

Next, the remote sends a signal, noted at 62, corresponding to "enter". Again, a pause is imposed between signals, noted at 64. In the block 66, the remote device sends a signal for "down", then another pause occurs as at 68, then another "enter", at 70. Another pause at 72, then another "down" signal, at 74. Another pause follows as noted at 76, then a signal for "right" (78). Another pause at 79, then a "down" signal at 80, pause at 81, "enter" at 82. Another pause at 84, "down" at 86, a pause at 88 and an "enter" signal at 90. Another pause at 92, then five sequential "up" command signals are sent, as indicated in blocks 94 and 98, separated by pauses (96). After a final pause an "enter" signal is sent at 100. As noted above, these last commands return the screen to the main display and normal camera function. The automatic white balance adjustment has been carried out.

The sequence of commands described above for the white balance function (or for any other multi-input function selection for the camera) can easily be implemented in electronics and programming within the remote/handle by one of skill in the art. The generated signals are similar to those produced by the manufacturer-supplied remote device for the video camera, but the sequence of signals is programmed to occur automatically as needed, and as explained in the flow chart. For other cameras other programmed command sequences will be executed.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. An underwater camera system, comprising:
    an underwater camera housing,
    a camera contained in the underwater housing, the camera being of the type that includes video photography settings selectable through a menu requiring multiple selection steps and normally operated in sequence by a user who enters separately a series of selections, and the camera including remote operation capability for receiving a series of input signals entered on a wireless remote device by a user as the user watches a monitor screen showing the selections, and
    a hand-operated remote device secured at exterior of the underwater housing and having at least one customized shortcut button effective via programming in the remote device to cause, when pushed, the remote device to emit automatically a series of wireless command signals in a prescribed sequence to the camera, including pauses between command signals, to proceed through the menu, to progress through steps of a camera menu tree so as to select a desired setting for a photographing function, wherein the series of wireless command signals in the prescribed sequence includes at least five signals,
    whereby a diver can conveniently effect camera setting adjustments without having to execute a series of sequential steps while viewing the monitor screen.

2. The system of claim 1, wherein the hand-operated remote device is incorporated in a handle secured to the side of the underwater housing.

3. The system of claim 2, wherein the handle is programmed with multiple camera sequences such that the user can, by holding down a set of buttons simultaneously on at least one handle, select different programming for the customized button to adapt to different cameras that have different sequences required to effect reset of the desired camera function.

4. The system of claim 2, wherein the handle is removable from the housing and is water sealed independent of the housing.

5. The system of claim 2, including two handles, one at each of left and right sides of the underwater camera housing, each handle having buttons for control of the camera.

6. The system of claim 1, wherein the desired setting for a photography function of the camera is a white balance setting.

7. In an underwater photography system including a digital camera contained within a water-sealed underwater housing, the housing having at least one gripping handle and the camera having capability of remote control operation of shutter and function settings using a hand-held remote device, the improvement comprising:
    on a handle of the underwater housing, a customized shortcut button that provides access with a single push of the button to commands, in the form of signals to the camera, that are not normally accessible with a single user input, the pressing of the customized button activating a signal emitter that emits a series of signals in a prescribed sequence, with preselected pauses between signals, that will cause a stepwise progression of selections to reset a desired camera function, mimicking a sequence of steps that would have to be taken manually by a user with a hand-held remote device, and
    the sequential series of signals comprising at least five signals in sequence which emulate a sequence of steps which would have to be taken manually by the user with a hand-held remote device.

8. The improvement defined in claim 7, wherein the desired camera function is white balance.

9. The improvement of claim 7, wherein the handle is programmed with multiple camera sequences such that the user can, by holding down a set of buttons simultaneously on at least one handle, select different programming for the customized button to adapt to different cameras that have different sequences required to effect reset of the desired camera function.

10. The improvement of claim 9, wherein the desired camera function is white balance.

* * * * *